United States Patent [19]
Tolle

[11] 3,898,756
[45] Aug. 12, 1975

[54] FISHING ROD HOLDER

[76] Inventor: Denver V. Tolle, 954 E. Locust St., Canton, Ill. 61520

[22] Filed: Sept. 5, 1974

[21] Appl. No.: 503,457

[52] U.S. Cl. ............................ 43/21.2; 43/1; 47/1.3
[51] Int. Cl.² .................... A01K 97/10; A01G 7/04
[58] Field of Search .......... 43/21.2, 1; 47/1.3; 119/1

[56] References Cited
UNITED STATES PATENTS

| | | | |
|---|---|---|---|
| 879,052 | 2/1908 | Jeranek | 43/21.2 |
| 1,577,612 | 3/1926 | Dees | 43/21.2 |
| 1,654,876 | 1/1928 | Hemming | 43/21.2 |
| 2,607,164 | 8/1952 | Fenton | 43/1 |
| 3,021,101 | 2/1962 | Gliebe | 43/21.2 |
| 3,058,250 | 10/1962 | Thomas | 43/21.2 |
| 3,820,279 | 6/1974 | Sieper | 47/1.3 |

Primary Examiner—Warner H. Camp
Attorney, Agent, or Firm—L. S. Van Landingham, Jr.

[57] ABSTRACT

A non-electrically conductive tubular member for holding a fishing rod is connected by a bushing to an electrically conductive ground spike and means are provided for connecting the spike to a source of electricity, which together with ancillary items creates an electrical field in the earth for supplying live bait.

16 Claims, 7 Drawing Figures

PATENTED AUG 12 1975
3,898,756
SHEET 1
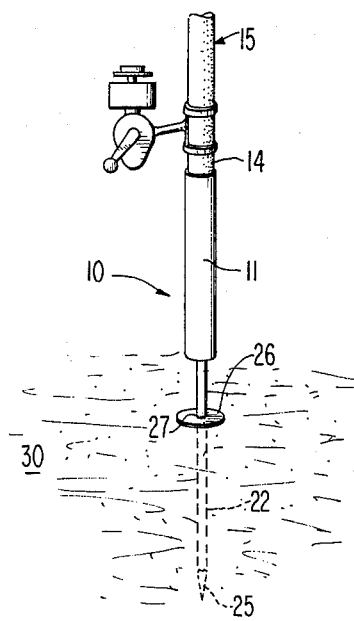
FIG.1
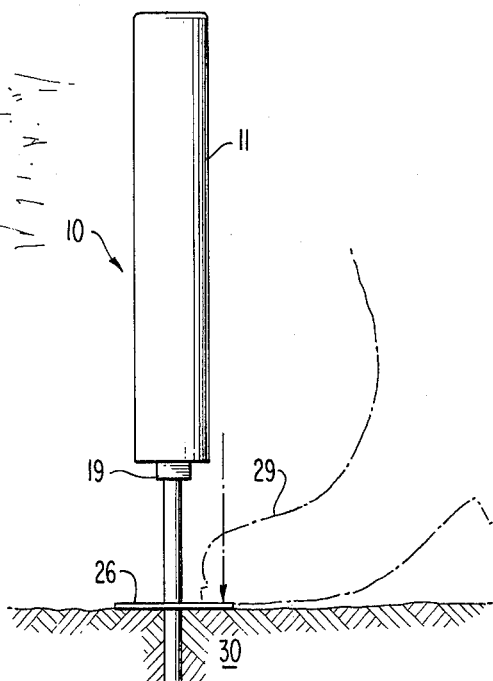
FIG.3
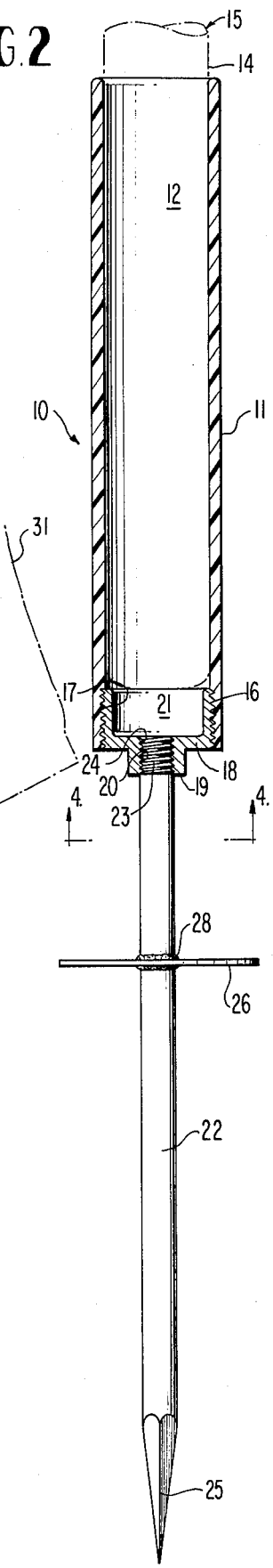
FIG.2
FIG.5

FISHING ROD HOLDER

BACKGROUND OF THE INVENTION

This invention is broadly related to holders for fishing rods of the surf or spinning types. In a further embodiment, the invention is concerned with a fishing rod holder which is provided with ancillary items to be used as a means of obtaining live bait.

A wide variety of fishing rod holders have been proposed heretofore. However, in general, the prior art fishing rod holders have had one or more deficiencies and thus were not entirely satisfactory.

For example, many of the fishing rod holders of the prior art were not omni-directional in action, rigid and self stabilizing. Other fishing rod holders were difficult, if not impossible, to insert in the soil or sand to a depth sufficient to be effective for the intended purpose. Still other fishing rod holders damaged the handle or reel of the fishing rod and were thus unsatisfactory. The prior art fishing rod holders also were not adapted to enable the live bait supply to be conveniently replenished as needed without interrupting the fishing.

As a result of the foregoing and still other deficiencies well known to those skilled in this art, fishermen have long sought an entirely satisfactory fishing rod holder. However, one has not been available prior to the present invention in spite of the long standing need therefor.

SUMMARY OF THE INVENTION

In one important presently preferred embodiment, the invention provides an improved omni-directional, rigid, easily inserted, self-stabilized holder for surf or spinning types of fishing rods. A tubular plastic receptacle is provided for holding the fishing rod handle or grip. The selected plastic is preferably a semi-solid and is sufficiently soft and elastic to markedly reduce chafing of the fishing rod handle and the reel. A steel insertion rod is securely attached to the lower end of the tubular receptacle. The insertion rod preferably terminates in an elongated four sided pick-type point to obtain easier penetration of soil or sand during use. A steel inserter-stabilizer disc is securely attached to the insertion rod and is positioned a sufficient distance from the point to assure penetration to an optimum depth. The disc forms substantially a 90° angle with the inserter rod and makes a 90° conversion of lateral forces to compress the soil or sand therebeneath before the rod holder can tip over. The entire assembly is stablized even when a large fish is hooked. Other problems common to prior art rod holders, such as tip-over and inadequate insertion depth, are also overcome.

In another presently preferred embodiment, the invention provides an improved rod holder with ancillary items to be used as a means of obtaining live earthworms for bait. The insertion member for the rod holder is connected to one electrical lead of a suitable source of electric power, such as 110–120 volts A.C. Another similar insertion member is provided as an auxiliary electrode and it is connected through a wiring harness to the other electrical lead of the electric power source. An electrical field is set up within the soil or sand between the two electrodes. The earthworms in the vicinity of the electric field are caused to come to the surface of the soil and they are collected for use as bait. The bait supply may be replenished without interrupting the fishing. Also, in remote areas a suitable electric power source may be provided by using an inexpensive voltage inverter (12–14 volts D.C./110–120 volts A.C.) powered by the battery of an automotive vehicle, such as a car, truck or camper.

It is therefore one important object of the invention to provide an improved omni-directional, rigid, self-stabilized holder for fishing rods of the surf or spinning types.

It is a further object to provide a fishing rod holder which is easily inserted in sand or soil to a depth sufficient to anchor the rod holder in a desired location.

It is still a further object to provide a fishing rod holder which markedly reduces chafing of the fishing rod handle and reel during use.

It is still a further object to provide a fishing rod holder with ancillary items which may be used to replenish the live bait supply by creating an electrical field in the earth.

It is still a further object to provide a fishing rod holder and ancillary items as set out above which may be used to replenish the live bait supply as needed without interrupting the fishing.

Still other objects and advantages of the invention will be apparent to those skilled in this art upon reference to the following detailed description and the accompanying drawings.

BRIEF DESCRIPTION OF THE DRAWINGS

FIG. 1 is a view in elevation of one presently preferred embodiment of the improved fishing rod holder of the invention which further illustrates the manner in which the rod holder is used to support a fishing rod;

FIG. 2 is an enlarged view in elevation, partially in cross section, of the fishing rod holder of FIG. 1;

FIG. 3 is a view in elevation of the fishing rod holder of FIG. 1 illustrating the presently preferred method of inserting the insertion rod therefor into the soil;

FIG. 5 is a view in elevation of another presently preferred embodiment of the fishing rod holder of the invention, together with certain ancillary items, further illustrating the use thereof in obtaining live earthworms for bait;

Figure 6:
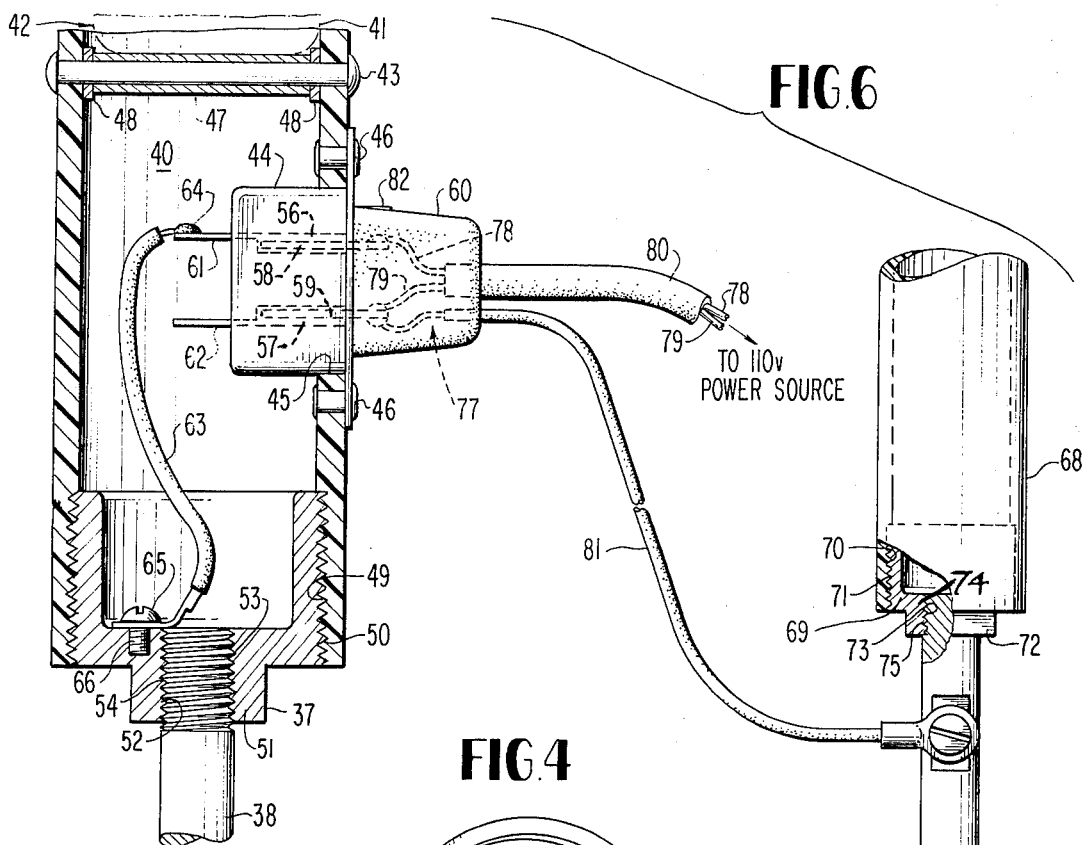
FIG. 6 is an enlarged elevational view of the fishing rod holder of FIG. 5 which is shown partially in cross section and with portions thereof being broken away in the interests of clarity.

DETAILED DESCRIPTION OF THE INVENTION INCLUDING THE PRESENTLY PREFERRED EMBODIMENTS THEREOF

FIGS. 1–4 illustrate one basic presently preferred embodiment of the fishing rod holder 10 of the invention. The rod holder 10 includes an elongated tubular member 11 which is open at its upper end to provide easy access to the interior 12 and allow the handle 14 of a fishing rod 15 to be inserted therein. The lower end of tubular member 11 has internally arranged threads 16 which are in tightly threaded engagement with the externally arranged threads 17 of cup-shaped bushing 18. The neck portion 19 projecting downward from bushing 18 has an internally threaded bore 20 extending longitudinally therethrough in communication with the ambient atmosphere and the interior 21. The round insertion rod 22 is externally threaded on its upper end and the threads 23 are in tightly threaded engagement with the internal threads 24 of bore 20. The lower end of rod 22 terminates in an elongated four-sided point 25 and a flat circular inserter-stabilizer disc 26 is rigidly mounted on rod 22 at a suitable point intermediate the threads 23 and the point 25. As is best seen in FIGS. 1-3, the rod 22 is inserted through an opening 27 in disc 26 and then the disc 26 and rod 22 are rigidly joined together by means of a welding bead 28. The disc 26 is positioned on rod 22 so as to form approximately a 90° angle therewith.

Figure 4:
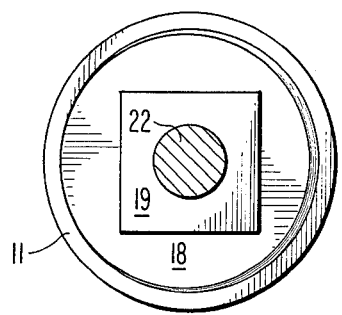
FIG. 4 is a cross sectional view taken along the lines 4—4 of FIG. 2.

The tubular member 11 is preferably formed from an elastic, relatively soft material such as a plastic which prevents chafing of the fishing rod handle or grip and the reel. The presently preferred material of construction is acrylonitrile-butadiene-styrene plastic. The internal diameter of the tubular member 11 should be of a size to easily receive the fishing rod handle 14, and of a length sufficient to accommodate the lenght of handle 14. For use with most fishing rods, the internal diameter of member 11 is approximately 1 to 2 inches and preferably about 1½ inch and the overall length is approximately 8 to 16 inches and preferably about 12 inches. The internal threads 16 usually extend about ½ to 1½ inches into member 11, and preferably approximately 1 inch. The threads 16 should be of the National Pipe Taper type so as to obtain a rigid vibration resistant connection with bushing 18. The bushing 18 is preferably constructed of cast steel and the threads 17 and 24 are preferably of the National Pipe Taper type so as to insure rigid vibration resistant connections with the member 11 and the rod 22. As is best seen in FIG. 4, the neck 19 is preferably square in cross section so as to allow it to be conveniently held with a wrench at the time of attaching member 11.

The insertion rod 22 should be constructed of a strong material such as a cold rolled steel rod having a sufficiently large diameter to allow it to be inserted into sand or soil and thereby provide a rigid, non-flexing support for the completed assembly. A steel rod approximately three-sixteenths to five-eighths inch in diameter is satisfactory. The upper end of rod 22 is preferably threaded with National Pipe Taper type threads, so as to allow a rigid vibration resistant connection to be made with bushing 18. The overall length of rod 22 should be about 12 to 20 inches and preferably about 16 inches for surf fishing (insertion into sand), and about 10 to 14 inches and preferably about 12 inches for fresh water fishing (insertion into soil). The threads 23 should extend about ½ to 1½ inches and preferably about 1 inch along the upper end of rod 22.

The four-sided point 25 may be formed on the lower end of insertion rod 22 by grinding, forging, or other suitable method, to assure the desired shape and dimensions Elongating the point 25 to at least 2 inches enhances the superior penetration characteristics.

The inserter-stabilizer disc 26 should be formed of a strong, rigid, non-flexing material such as a circular cold rolled steel disc approximately one thirty-second to one-fourth inch in thickness and preferably about one-sixteenth inch, and approximately 2 to 4 inches in diameter and preferably about 3¼ inches. The opening 27 should be of a size to easily receive the rod 22 and allow the same to be welded rigidly thereto. The disc 26 is positioned a suitable distance from the top of rod 22 to allow sufficient clearance for the toe 29 of foot 31 to be placed on the top thereof and pressed downward to thereby insert rod 22 in soil or sand 30 to the depth illustrated in FIG. 3.

The fishing rod holder 10 of the invention is very easy to use. For instance, the holder 10 may be installed for use by grasping the tubular member 11 with one hand and holding the assembly in an upright position with the point 25 touching the soil 30, and then applying pressure with toe 29 as illustrated in FIG. 3. Very little pressure is required for full insertion of rod 22 due to the elongated four-sided point 25. The rod 22 is fully inserted when the weld 28 and the undersurface of disc 26 are in firm contact with the surface of the sand or soil 30. Surprisingly the holder 10 may be tilted up to 30° towards the water being fished without an appreciable loss of stability.

When the rod 22 is fully inserted, the handle 14 of fishing rod 15 may be inserted into tubular member 11 as illustrated in FIG. 1. Upon hooking a fish, the hooked fish will exert a lateral force or pull at the top of member 11 through the rod 15. If the pull is sufficiently strong, the force will tip over a prior art rod holder and thereby result in the loss of the rod and reel. However, due to the inserter-stabilizer disc 26, the lateral forces are converted 90° to downward forces, compressing the sand or soil 30 and stabilizing the entire assembly. Thus, the effects of the pulling of the hooked fish are nullified and the holder 10 is self-stabilizing. The fishing line will normally break before the lateral forces are great enough to upset the holder 10 of the invention.

The holder 10 may be easily removed from the soil 30 by pulling upward with a twisting motion. The holder 10 is difficult to remove without the twisting motion due to its highly effective design and stability when in place in the soil 30.

FIGS. 1 to 4 illustrate the presently preferred basic rod holder 10 of the invention. The rod holder 35 illustrated in FIGS. 5 to 7 is constructed generally along the lines of the holder 10, but also includes certain ancillary items which allow it to be used in obtaining live bait such as earthworms.

Figure 7:
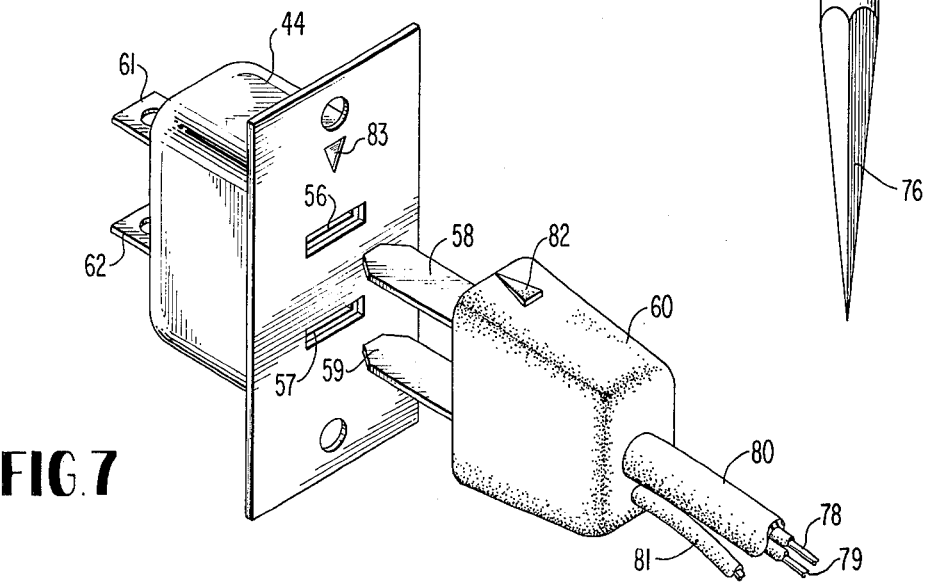
FIG. 7 is an exploded view similar to FIG. 6, with portions thereof being broken away further illustrating the wiring connections for the wiring harness, including the electrical receptacle and the plug, and the detachable feature thereof.

Referring now to FIGS. 5-7, the rod holder 35 includes a tubular member 36, a bushing 37, an insertion rod 38 and an inserter-stabilizer disc 39 of the same general basic construction as the tubular member 11, bushing 18, insertion rod 22 and inserter-stabilizer disc 26 previously discussed. However, in this embodiment of the invention, it is essential that the tubular member 36 be constructed of a non-electrically conductive material, and that the bushing 37 and the insertion rod 38 be constructed of an electrically conductive material.

The tubular member 36 may be constructed of a plastic such as acrylonitrile-butadiene-styrene, or other suitable non-electrically conductive plastic. The interior 40 is of a size to conveniently receive and retain the handle 41 of the fishing rod 42. The extent of the downward movement of handle 41 is controlled by means of a rivet 43 which extends through the tubular member 36. The rivet 43 is positioned a short distance above the electrical receptacle 44 which is permanently mounted in opening 45 by means of a pair of spaced rivets 46. The buckling of rivet 43 during installation is prevented by means of a sleeve 47 which extends across the interior 40. A pair of washers 48 are provided at the end of sleeve 47 to prevent the ends thereof from damaging the internal surface of tubular member 36. The lower end of tubular member 36 is provided with internal threads 49 which are in tightly threaded engagement with the external threads 50 of bushing 37.

The bushing 37 is preferably constructed of an electrically conductive metal such as cast steel and may have the same basic configuration as bushing 18. The neck 51 is provided with a bore 52 having internal threads 53. The internal threads 53 are in tightly threaded engagement with the external threads 54 on the upper end of insertion rod 38. The insertion rod 38 is preferably constructed of an electrically conductive metal such as a cold rolled steel rod. The insertion rod 38 is provided with an inserter-stabilizer disc 39 and a four-sided point 55 as previously described in FIGS. 1–4.

The electrical receptacle 44 is provided with the usual pair of spaced electrical contacts 56 and 57 which receive the spaced terminals 58 and 59 on electrical plug 60 in an attachable and detachable fashion which is best illustrated in FIGS. 6 and 7. The electrical contacts 56 and 57 are in turn electrically connected to external terminals 61 and 62, respectively, which extend into the interior 40. An insulated electrical wire 63 is electrically connected by means of solder 64 on its upper end to terminal 61, and on its lower end to bushing 37 by means of a bolt 65 which is threaded into threaded opening 66. Inasmuch as rod 38 is tightly threaded into bore 52 of bushing 37, and each is electrically conductive, it follows that when the plug 60 is inserted into receptacle 44 as illustrated in FIG. 6, the rod 38 is in electrical contact with terminal 58 through bushing 37, wire 63, terminal 61 and contact 56. This arrangement renders rod 38 capable of acting as a primary electrode in addition to performing its usual function of an insertion rod.

The auxiliary electrode generally designated as 34 may be constructed along the lines of holder 10 with the exception of omitting the disc 26 and reducing the size. Thus, the electrode 34 may include a non-electrically conductive plastic tubing 68 which is attached to a bushing 69, and which is in turn attached to the upper end of the electrode 67. While any convenient means of attachment may be used, it is usually preferred to provide internal threads 70 on the lower end of tubing 68 which are in tightly threaded engagement with external threads 71 on bushing 69. The neck 72 of bushing 69 is provided with a bore 73 which has internal threads 74 in tightly threaded engagement with the external threads 75 on the end of electrode 67. The threads 70, 71, 74 and 75 are preferably of the National Pipe Taper type so as to assure rigid vibration resistant connections. The lower end of electrode 67 terminates in a four-sided pick type point 76 which may be shaped and formed as previously described for point 25.

The electrode 67 is electrically connected through an attachable and detachable wiring harness 77 to one electrical lead of a suitable source of alternating electric current, and the rod 38, which serves as the primary electrode, is electrically connected as previously described to the other electrical lead of the source of electric current. As is best seen in FIGS. 6 and 7, the wiring harness 77 includes a standard electrical plug 60 provided with terminals 58 and 59 having ends which project outwardly therefrom. The terminals 58 and 59 also extend inwardly and are imbedded on their inner ends in plug 60. The terminals 58 and 59 are electrically connected on their inner ends to electrical leads 78 and 79, respectively of insulated double wire 80. The other ends of electrical leads 78 and 79 are connected to their respective terminals of a suitable source of electric power such as 110 volt alternating current. If desired, the source of electric power may be provided by a voltage inverter (12–14 V. D.C./110 V. A.C.) which may be powered by the battery of an automotive vehicle, such as a car, truck, camper and the like.

The electrode 67 is electrically connected by means of an insulated wire 81 to the terminal 59 of plug 60 to thereby complete the electrical circuit when the primary electrode 38 and the electrode 67 are inserted in spaced relationship into soil and electrical current is supplied. When this is done, an electrical field is set up within the soil 84 between the electrodes 38 and 67 which causes earthworms to come to the surface where they may be collected for bait without interrupting the fishing. As is best seen in FIG. 7, the plug 60 may be inserted into receptacle 44 when the electrode 67 is to be used for gathering bait, and it may be easily detached therefrom when the bait gathering operation has been completed. The surface of plug 60 and the surface of receptacle 44 are provided with polarity markings 82 and 83, respectively to aid in establishing the electrical circuit when the electrodes 38 and 67 are to be placed in use.

The rod holder 35 may be used for fishing in the same manner as previously described for rod holder 10. When in such use, and when it is also desired to collect earthworms for bait, the electrode 67 is simply inserted into the soil in spaced relationship with the primary electrode 38, and plug 60 is inserted into receptacle 44 taking care that the polarity markings 82 and 83 match. The electrical leads 78 and 79 are then electrically connected to a suitable source of electric power, and an electric field is thereby established between the electrodes 38 and 67. The spacing of electrodes 38 and 67 will be dependent upon the conductivity of the soil, the moisture content, and other factors, but usually the spacing is about 4 feet.

The foregoing detailed description and the accompanying illustrative drawings are for purposes of illustration only, and are not intended as being limiting to the spirit or scope of the appended claims.

I claim:

1. A fishing rod holder comprising
    an elongated non-electrically conductive tubular member open at one end and internally threaded on the other end and having an internal diameter of a size to receive the handle of a fishing rod,
    the tubular member being constructed of a material which is non-chafing and sufficiently pliable to prevent damage to the handle of the fishing rod when inserted therein,
    an externally threaded bushing in tightly threaded engagement with the internal threads on the end of the tubular member,
    an elongated electrically conductive insertion member for inserting into soil and thereby anchoring the fishing rod holder in a desired location,
    the bushing having a longitudinally extending internally threaded bore therein, the insertion member being externally threaded on one end and the external threads thereof being in tightly threaded engagement with the internal threads in the bore of the bushing, the said threads of the tubular member, the bushing and the insertion member being tapered pipe-type threads whereby the resultant threaded connections are rigid and vibration resistant, the end of the insertion member remote from the said end having the threads terminating in a sharp point which facilitates inserting the same into soil, an inserter-stabilizer member rigidly mounted on the insertion member and extending outward therefrom at a location intermediate the said threads and point, the inserter-stabilizer forming approximately a 90° angle with the insertion member and being sufficiently removed from the point to allow the insertion member to be inserted into soil to a depth sufficient to anchor the fishing rod holder, and means carried by the electrically conductive insertion member for electrically connecting the same to a source of electricity.

2. The fishing rod holder of claim 1 wherein the said threads of the tubular member, the bushing and the insertion member are threads of the National Pipe Taper type whereby the resultant threaded connections are rigid and vibration resistant.

3. The fishing rod holder of claim 1 wherein the tubular member is constructed of a plastic material which is sufficiently pliable to prevent damage to the handle of the fishing rod when inserted therein.

4. The fishing rod holder of claim 1 wherein the said point on the insertion member is four sided and sufficiently elongated to facilitate easy insertion into soil.

5. The fishing rod holder of claim 1 wherein the said inserter-stabilizer is a substantially flat disc which makes a 90° conversion of the lateral forces resulting from a hooked fish pulling on the fishing rod whereby the rod holder is stabilized and prevented from tipping over.

6. The fishing rod holder of claim 2 wherein the tubular member is constructed of acrylonitrile-butadiene-styrene plastic which is sufficiently pliable to prevent damage to the handle of the fishing rod when inserted therein.

7. The fishing rod holder of claim 6 wherein the said point on the insertion member is four sided and sufficiently elongated to facilitate easy insertion into soil.

8. The fishing rod holder of claim 7 wherein the said inserter-stabilizer is a substantially flat disc which makes a 90° conversion of the lateral forces resulting from a hooked fish pulling on the fishing rod whereby the rod holder is stabilized and prevented from tipping over.

9. A fishing rod holder comprising an elongated non-electrically conductive tubular member open at one end and having an internal diameter of a size to receive the handle of a fishing rod, a first elongated electrically conductive insertion member having a point on one end for inserting into soil and thereby anchoring the fishing rod holder in a desired location, connecting means for securely connecting the end remote from the pointed end of the said first insertion member with the end of the said tubular member remote from the open end, a first electrical member mounted on the tubular member including at least one electrical terminal for establishing an electrical circuit, a second electrical member including at least first and second electrical terminals for establishing an electrical circuit, the first and second electrical members including cooperating attachable and detachable electrical connecting means whereby the first and second electrical members may be detachably joined together with their respective first electrical terminals being electrically connected and thereafter detached when it is desired to break the electrical connection between their said respective first electrical terminals, a second elongated electrically conductive insertion member having a point on one end for inserting into soil, means for electrically connecting the first terminal of the second electrical member to a source of electric power, means for electrically connecting the second terminal of the second electrical member to the said source of electric power, means for electrically connecting the said terminal of the first electrical member to the said first insertion member whereby the first insertion member is also capable of performing as a first electrode, and means for electrically connecting the said second terminal of the second electrical member to the said second insertion member whereby it is capable of performing as a second electrode, the last named electrical connecting means being sufficiently elongated whereby the said first and second insertion members may be positioned a substantial distance apart.

10. The fishing rod holder of claim 9 wherein the upper portion of the second insertion member is electrically insulated whereby the second insertion member may be moved about without danger of an electric shock.

11. The fishing rod holder of claim 9 wherein the tubular member is constructed of a plastic material which is sufficiently pliable to prevent damage to the handle of the fishing rod when inserted therein.

12. The fishing rod holder of claim 9 wherein the said point on at least one of the first and second insertion members if four sided and sufficiently elongated to facilitate easy insertion into soil.

13. The fishing rod holder of claim 9 wherein a substantially flat inserter-stabilizer member is rigidly mounted on at least the first insertion member at a point remote from the point thereof, the inserterstabilizer forming approximately a 90° angle with the insertion member and being sufficiently removed from the point to allow the insertion member to be inserted into soil to a depth sufficient to anchor the fishing rod holder in a desired location.

14. The fishing rod holder of claim 13 wherein the said point on the first insertion member is four sided and not less than about 2 inches in length.

15. The fishing rod holder of claim 14 wherein the tubular member is constructed of acrylonitrile-butadiene-styrene plastic which is sufficiently pliable to prevent damage to the handle of the fishing rod when inserted therein.

16. The fishing rod holder of claim 15 wherein the said inserter-stabilizer is a flat disc which makes a 90° conversion of the lateral forces resulting from a hooked fish pulling on the fishing rod whereby the rod holder is stabilized and prevented from tipping over.

* * * * *